(12) United States Patent
Mikawa (10) Patent No.: US 11,196,920 B2
(45) Date of Patent: Dec. 7, 2021

(54) IMAGING APPARATUS AND METHOD FOR CONTROLLING AN INSERTING/REMOVING OPERATION OF AN OPTICAL FILTER

(71) Applicant: CANON KABUSHIKI KAISHA, Tokyo (JP)

(72) Inventor: Atsushi Mikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/671,003

(22) Filed: Oct. 31, 2019

(65) Prior Publication Data

US 2020/0154040 A1 May 14, 2020

(30) Foreign Application Priority Data

Nov. 14, 2018 (JP) .............................. JP2018-213518

(51) Int. Cl.
*H04N 5/232* (2006.01)
*H04N 5/91* (2006.01)
*H04N 5/225* (2006.01)
*G11B 27/02* (2006.01)

(52) U.S. Cl.
CPC ......... *H04N 5/23229* (2013.01); *G11B 27/02* (2013.01); *H04N 5/2254* (2013.01); *H04N 5/232939* (2018.08); *H04N 5/91* (2013.01)

(58) Field of Classification Search
CPC .... H04N 5/23229; H04N 5/2254; H04N 5/91; H04N 5/232939; H04N 5/772; H04N 9/8205; G11B 27/02
See application file for complete search history.

(56) References Cited

U.S. PATENT DOCUMENTS

| | | | | |
|---|---|---|---|---|
| 2002/0021354 A1* | 2/2002 | Suzuki | ................. | H04N 13/296 348/46 |
| 2006/0192884 A1* | 8/2006 | Tsuda | ................. | H04N 5/23241 348/342 |
| 2009/0097136 A1* | 4/2009 | Otsu | ....................... | G03B 9/00 359/739 |
| 2014/0348489 A1* | 11/2014 | Stephens | .......... | G11B 20/10527 386/242 |
| 2020/0099867 A1* | 3/2020 | Sugimoto | ............ | H04N 5/2351 |

FOREIGN PATENT DOCUMENTS

JP 2013-70265 A 4/2013

* cited by examiner

*Primary Examiner* — Hung H Lam
(74) *Attorney, Agent, or Firm* — Canon U.S.A., Inc. IP Division (57) ABSTRACT

An imaging apparatus includes an image sensor, a control unit configured to control an operation for inserting and retracting an optical filter into/from an optical path of light incident on the image sensor, and an output unit configured to output video data obtained by the image sensor in association with information about timing of insertion/retraction of the optical filter.

16 Claims, 6 Drawing Sheets

IMAGING APPARATUS AND METHOD FOR CONTROLLING AN INSERTING/REMOVING OPERATION OF AN OPTICAL FILTER

BACKGROUND

Field of the Disclosure

The present disclosure relates to an imaging apparatus for recording captured video data and a technique for controlling the same.

Description of the Related Art

Recent imaging using a video camera, combined with external factors, such as increased capacity of recording media, has tended to be performed over a prolonged period. To avoid missing imaging opportunities on occasions, such as a wedding ceremony, image recording may be continued without splitting image files scene by scene. There has been a problem of difficulty in searching a video file thus captured over a long time for intended scenes in editing, and removing unneeded scenes has been time consuming. Japanese Patent Application Laid-Open No. 2013-70265 discusses a technique for determining whether each frame of captured video data is needed, and storing the determination result as metadata in association with the recording position in the video image so that only needed frames can be read out during reading.

The technique discussed in Japanese Patent Application Laid-Open No. 2013-70265 is directed to determining whether each frame is needed and to reading only needed frames, and thus has a problem of being unable to find out, after imaging, whether functions built in the camera have been applied to each video file. Whether an optical filter is applied in particular causes significant changes in characteristics, such as the brightness and tone of the video image.

SUMMARY

It may be beneficial for the user to be able to find out a presence or absence and a period of application of an optical filter. Some embodiments are directed to enabling a presentation of the presence or absence, and the period of application, of the optical filter to the user in an easily understandable manner when the user checks the captured video image.

In some embodiments, an imaging apparatus includes an image sensor, a control unit configured to control an operation for inserting and retracting an optical filter into; from an optical path of light incident on the image sensor, and an output unit configured to output video data obtained by the image sensor in association with information about timing of insertion/retraction of the optical filter.

Further features of various embodiments will become apparent from the following description of exemplary embodiments with reference to the attached drawings.

DESCRIPTION OF THE EMBODIMENTS

Exemplary embodiments will be described in detail below with reference to the accompanying drawings. The following embodiments are examples, and appropriate modifications and changes may be made thereto depending on configuration and various conditions of an apparatus to which the various embodiments are applied. Some embodiments are not limited to the following exemplary embodiments. Part of the exemplary embodiments described below may be combined as appropriate. In the following exemplary embodiments, a neutral density (ND) filter is taken as an example of an optical filter. However, this is not restrictive. Other optical filters, such as an infrared (IR) filter for passing only infrared rays in incident light and a polarizing (PL) filter, may be used.

Figure 1:
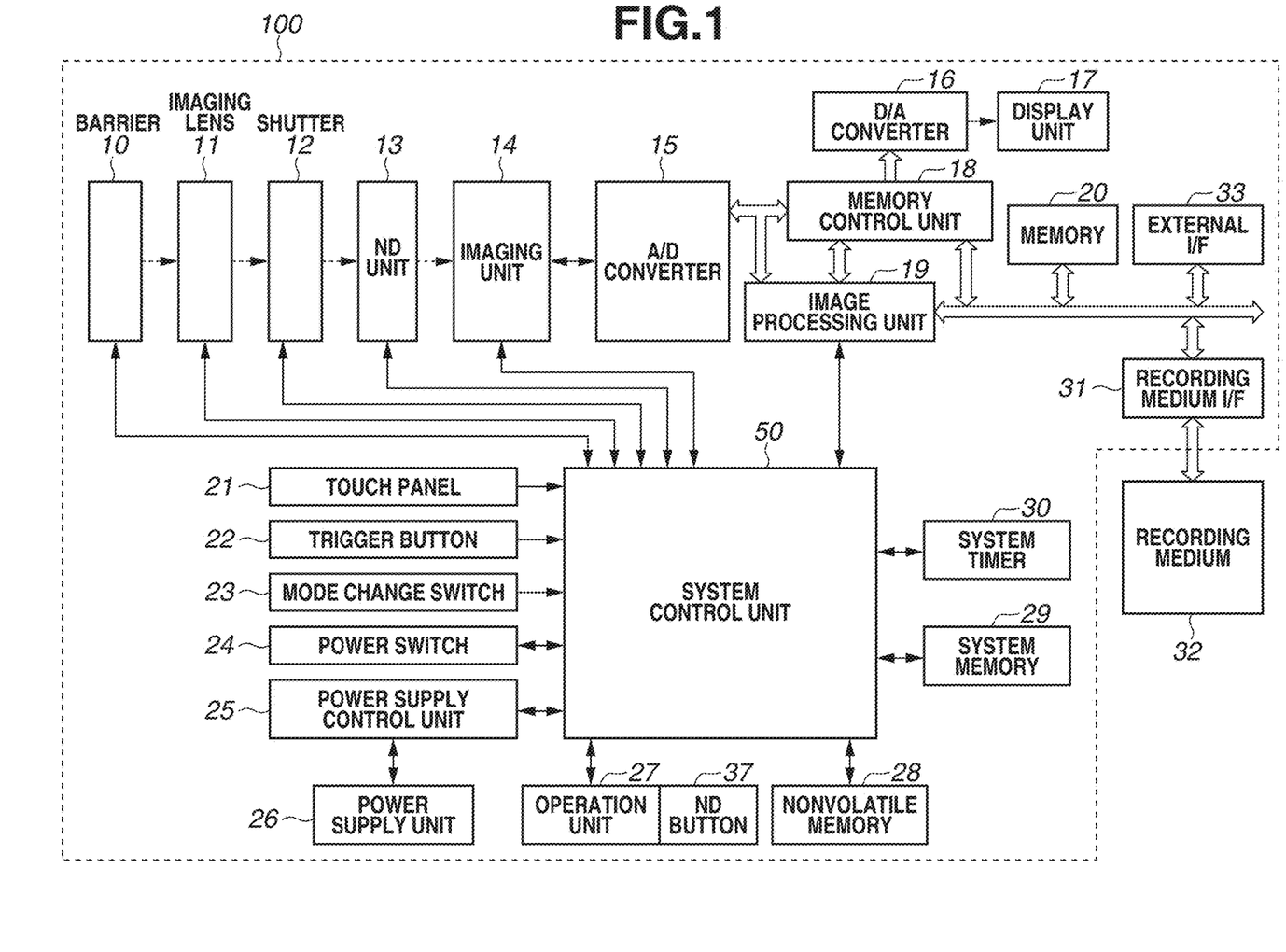
FIG. 1 is a block diagram illustrating a schematic configuration of a camera according to an exemplary embodiment.

FIG. 1 is a block diagram illustrating a schematic configuration example of a digital video camera 100 (hereinafter, referred to as a camera 100) that can capture a moving video image as an application example of an imaging apparatus according to a first exemplary embodiment. While FIG. 1 illustrates a configuration example of a fixed lens camera in which an imaging lens 11 and an ND unit 13 are fixed to the camera main body, the camera 100 may be an interchangeable lens camera in which the imaging lens 11 and the ND unit 13 are configured as interchangeable units.

In FIG. 1, the imaging lens 11 is a lens unit including a zoom lens and a focus lens. A shutter 12 is configured to have an aperture function. The ND unit 13 includes an optical filter (ND filter) for reducing (attenuating) a light amount of light incident on an imaging unit 14 during imaging. The ND unit 13 includes a mechanism for enabling insertion and retraction of the ND filter into/from the optical path of the imaging lens 11. The imaging unit 14 is an image sensor including a charge-coupled device (CCD) or complementary metal-oxide-semiconductor (CMOS) sensor for converting an optical image formed by the imaging lens 11 into an electrical signal. An analog-to-digital (A/D) converter 15 converts an analog image signal output from the imaging unit 14 into a digital image signal (i.e., image data). A barrier 10 covers an imaging system of the camera 100, including the imaging lens 11, to prevent stains and damage to the imaging system including the imaging lens 11, the shutter 12, the ND unit 13, and the imaging unit 14.

An image processing unit 19 performs resize processing, such as predetermined pixel interpolation and reduction, and color conversion processing on data from the A/D converter 15 or data from a memory control unit 18. The image processing unit 19 also performs predetermined calculation processing by using captured image data, and performs through-the-lens (TTL) automatic white balance (AWB) processing based on the obtained calculation result.

The image data from the A/D converter 15 is written to a memory 20 via the image processing unit 19 and the memory control unit 18, or directly written to the memory 20 via the memory control unit 18. The memory 20 stores, for example, the image data captured by the imaging unit 14 and digitally converted by the A/D converter 15, metadata recorded in association with video data as will be described below, and image data to be displayed on a display unit 17. The memory 20 has a storage capacity sufficient to store a predetermined number of still images and a predetermined duration of moving images and sound.

The memory 20 also serves as an image display memory (e.g., video memory). A digital-to-analog (D/A) converter 16 converts image display data read from the memory 20 into an analog signal, and supplies the analog signal to the display unit 17. The image display data read from the memory 20 is thus displayed on the display unit 17 via the D/A converter 16. The display unit 17 is a display device, such as a liquid crystal display (LCD), and displays an image based on the analog image signal from the D/A converter 16. The display unit 17 can also be used as an electronic viewfinder by providing a through video display (e.g., live view display) that successively displays a video signal being captured by the imaging unit 14.

A non-volatile memory 28 is a memory serving as an electrically erasable and recordable recording medium. For example, an electrically erasable programmable read-only memory (EEPROM) may be used. The non-volatile memory 28 stores, for example, a constant number for operating a system control unit 50 and programs. As employed herein, the programs include computer programs for performing the processing of various flowcharts to be described below in the present exemplary embodiment.

The system control unit 50 is a control unit including at least one processor or circuit, and controls the entire camera 100. The system control unit 50 performs various processes according to the present exemplary embodiment to be described below by executing the programs stored in the non-volatile memory 28. A system memory 29 may be a random access memory (RAM), for example. The constant number and a variable number for operating the system control unit 50, and the programs read from the non-volatile memory 28, are loaded into the system memory 29. The system control unit 50 also performs display control by controlling the memory 20, the D/A converter 16, and the display unit 17. The system control unit 50 also performs TTL automatic focus (AF) processing, automatic exposure (AE) processing, and electronic flash (EF) (i.e., flash preliminary emission) processing by performing exposure control and ranging control based on results of predetermined calculation processing performed by the image processing unit 19.

A system timer 30 is a clocking unit that measures times used for various controls and a time of a built-in clock.

A mode change switch 23, a trigger button 22, an operation unit 27, and a touch panel 21 are operation input units for a user to input various operation instructions to the system control unit 50.

The mode change switch 23 generates a mode switch signal for switching an operation mode of the system control unit 50. The system control unit 50 switches an operation mode of the camera 100 between, for example, a recording mode and a reproduction mode based on the mode switch signal.

The trigger button 22 generates a trigger (e.g., release) signal to give an instruction to capture a still image and instructions to start and stop capturing a moving image to the system control unit 50. The system control unit 50 starts or ends a series of operations for imaging processing based on the trigger signal. As employed herein, the imaging processing includes processing for writing encoded image data accumulated in the memory 20 via the imaging unit 14, the image processing unit 19, and the memory control unit 18 into a recording medium 32.

Operation members of the operation unit 27 are assigned appropriate functions scene by scene based on selection operations made on various function icons displayed on the display unit 17, and function as various function buttons. Examples of the function buttons include a menu button; four directional buttons having up, down, left, and right directions; a set button; an end button; a return button; an image forward button; a jump button; a narrow-down button; and an attribute change button. For example, if the menu button is pressed, a menu screen for various settings is displayed on the display unit 17. The user can intuitively make various setting by using the menu screen displayed on the display unit 17, the four directional buttons, and the set button. The operation unit 27 of the camera 100 according to the present exemplary embodiment also includes an ND button 37 to be described below.

The touch panel 21 is a panel having a touch sensor that detects a touch on the display unit 17. The touch panel 21 and the display unit 17 can be integrally configured. The system control unit 50 can detect various operations on the touch panel 21. The touch panel 21 may be any type touch panel, including resistive, capacitive, surface acoustic wave, infrared, electromagnetic induction, image recognition, and optical sensor touch panels.

An external interface (I/F) 33 is an I/F unit for connecting the camera 100 to an external device. Examples of the external I/F 33 include video input/output terminals, such as a composite video input/output terminal and a High-Density Multimedia Interface (HDMI®) terminal, and I/Fs of Universal Serial Bus (USB), infrared, and wireless communication. A pointing device, such as a mouse, can also be connected to the external I/F 33 to be used as an operation input unit instead of the touch panel 21. In such a case, the system control unit 50 receives input from the mouse connected to the external I/F 33 and displays a pointer on the display unit 17, and further receives mouse movements and click signals, and thus performs control similar to the operations on the touch panel 21.

A power supply control unit 25 includes a battery detection circuit, a direct-current-to-direct-current (DC-DC) converter, and a switch circuit for switching blocks to be energized. The power supply control unit 25 detects the turning on/off of a power switch 24, the presence or absence of a battery mounted on a power supply unit 26, the type of battery, and a remaining battery level. The power supply control unit 25 controls the DC-DC converter based on the detection results and instructions from the system control unit 50, and supplies needed voltages to various parts, including the recording medium 32, for needed periods. The power supply unit 26 includes a primary battery, such as an alkali battery and a lithium battery, and/or a secondary battery, such as a nickel-cadmium (NiCd) battery, a nickel metal halide (NiMH) battery, and a lithium ion (Li) battery. The power supply unit 26 may include an alternating-current (AC) adaptor.

A recording medium I/F 31 is an I/F for the recording medium 32, such as a memory card and a hard disk. The recording medium 32 is a recording medium on which the image data stored in the memory 20 and accompanying metadata can be recorded. Examples of the recording medium 32 include a semiconductor memory, an optical disc, and a magnetic disk. The data recorded on the recording medium 32 is read by the recording medium I/F 31 and transferred to the memory 20. Metadata can be recorded by using, for example, a recording method compliant with Exchangeable image file format (Exit) for still images, and a recording method compliant with the Advanced Video Coding High Definition (AVCHD) standard for moving images.

In the camera 100 according to the present exemplary embodiment, the ND unit 13 includes an optical filter (ND filter) that attenuates the light amount of light incident on the imaging unit 14 as described above, and a not-illustrated mechanism that can insert and retract the ND filter into/from the optical path of the imaging lens 11. In the present exemplary embodiment, the system control unit 50 controls the operation of the ND unit 13 to insert or retract the ND filter into/from the optical path of the imaging lens 11 based on operations on the ND button 37.

The ND unit 13 includes one ND filter or a plurality of ND filters having respective different light attenuation amounts. For example, if the ND unit 13 includes only one ND filter, the ND unit 13 includes an insertion/retraction (i.e., insertion and/or retraction) mechanism that can switch between a state where the ND filter is inserted into the optical path of the imaging lens 11 and a state where the ND filter is retracted from the optical path (i.e., not-attenuating state). For example, if the ND unit 13 includes a plurality of ND filters, the ND unit 13 includes an insertion/retraction mechanism that can take a state where any one of the plurality of ND filters is inserted and retracted into/from the optical path in a switched manner and a state where none of the ND filters is located in the optical path (i.e., not-attenuating state). The operation of such an insertion/retraction mechanism of the ND unit 13 is controlled by the system control unit 50. The system control unit 50 performs control to operate the insertion/retraction mechanism of the ND unit 13 based on instructions made by the user via the ND button 37. In the present exemplary embodiment, an operation for inserting or retracing an ND filter into/from the optical path by the insertion/retraction mechanism of the ND unit 13 will be referred to as an ND filter insertion/retraction operation. While an ND filter insertion/retraction operation is performed, an outer frame of the ND filter and an ND filter holder enter the optical path. Accordingly, the video image temporarily includes the outer frame of the ND frame and the ND filter holder when the ND filter insertion/retraction operation is performed during imaging.

The system control unit 50 according to the present exemplary embodiment also performs control to record information indicating the presence or absence of the ND filter insertion/retraction operation and its operation period based on the operation of the ND button 37 as metadata associated with the captured video data. The system control unit 50 further displays a graphical user interface (GUI) screen to be described below, which is generated based on the presence or absence of the ND filter insertion/retraction operation and its operation period in the recorded video data, on the display unit 17, for example.

Figure 2A:
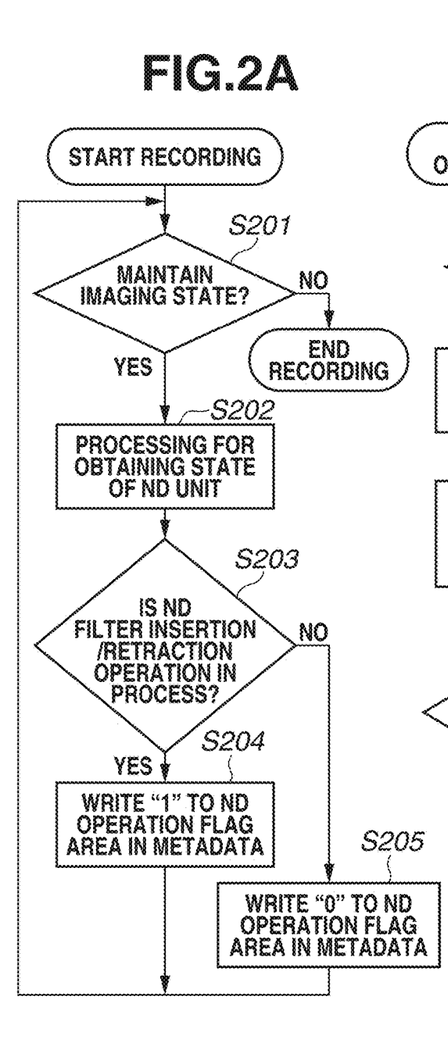
FIGS. 2A and 2B are flowcharts illustrating processing for writing metadata in association with a video file.
Figure 2B:
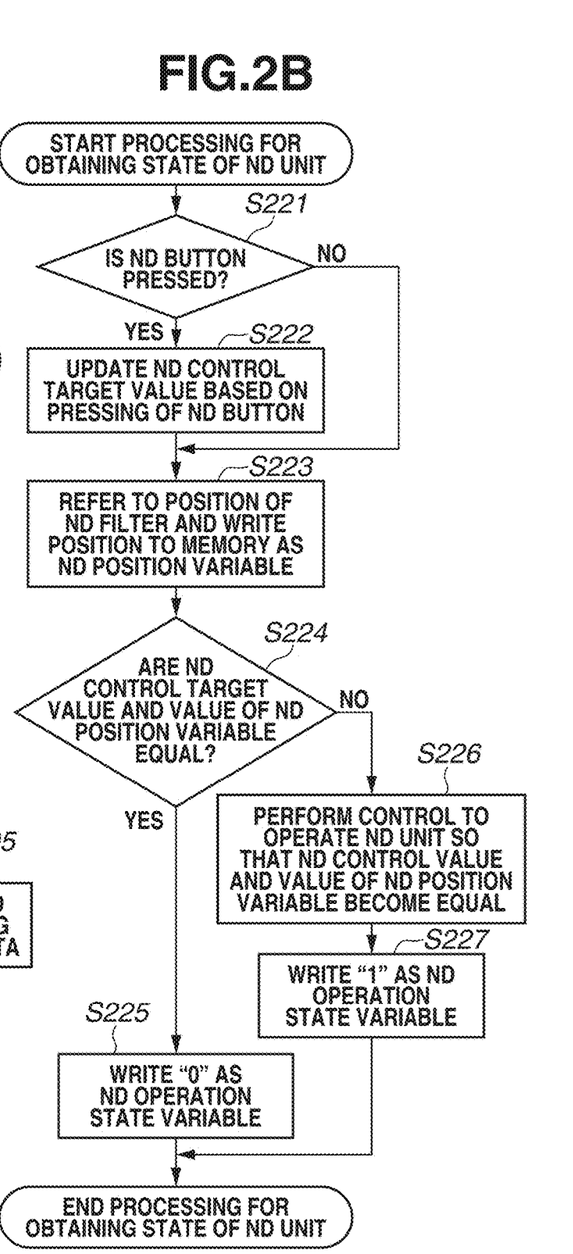

FIG. 2A is a flowchart of processing in which the camera 100 according to the present exemplary embodiment records metadata indicating the presence or absence of the ND filter insertion/retraction operation and its operation period during imaging in association with video data. FIG. 2B is a detailed flowchart of processing performed in S202 of FIG. 2A. The processing performed in the flowcharts in FIGS. 2A and 2B is implemented by loading a program stored in the nonvolatile memory 28 into the system memory 29 and executing the program by the system control unit 50. All the processing of the flowcharts performed in FIGS. 2A and 2B may be implemented by a hardware configuration. Part of the processing may be performed by a hardware configuration, and the rest of the processing may be performed by a program-based software configuration. The same applies to the other flowcharts to be described below.

Recording of metadata indicating the presence or absence of the ND filter insertion/retraction operation and its operation period starts in response to a start of imaging processing. The state of the camera 100 from a start to an end of imaging processing will hereinafter be referred to as an imaging state.

In S201, the system control unit 50 initially determines whether to maintain the imaging state. Specifically, if a pressing signal of the trigger button 22 is not received, it is determined that the system control unit 50 maintains the imaging state (YES in S201), and the processing proceeds to S202. On the other hand, if the pressing signal of the trigger button 22 is received, it is determined that the system control unit 50 does not maintain the imaging state (NO in S201), and the system control unit 50 stores the image data stored in the memory 20 and the accompanying metadata into the recording medium 32 via the recording medium I/F 31, and ends the imaging processing.

In S202, the system control unit 50 performs processing for obtaining the state of the ND unit 13. In the present exemplary embodiment, the processing for obtaining the state of the ND unit 13 refers to a series of processes from S221 to S227 in FIG. 2B. The series of processes will be described after the description of the entire processing illustrated in the flowchart of FIG. 2A.

In S203, the system control unit 50 refers to an ND operation state variable written in the memory 20, and determines whether the ND filter insertion/retraction operation is in process. Specifically, if the ND operation state variable is "1", the system control unit 50 determines that the ND filter insertion/retraction operation is in process (YES in S203), and the processing proceeds to S204. On the other hand, if the ND operation state variable is "0", the system control unit 50 determines that the ND filter insertion/retraction operation is stopped (NO in S203), and the processing proceeds to S205.

In S204 or S205, the system control unit 50 writes metadata into the memory 20 in synchronization with the timing of the video data read from the imaging unit 14 and written to the memory 20. Specifically, in a case of S204, the system control unit 50 additionally writes "1" as a flag value indicating that the ND filter insertion/retraction operation is in process to an ND operation flag area in the metadata recorded in association with the video data. On the other hand, in a case of S205, the system control unit 50 additionally writes "0" as a flag value indicating that the ND filter insertion/retraction operation is stopped to the ND operation flag area in the metadata. After S204 or S205, the processing returns to S201.

The series of processes for obtaining the state of the ND unit 13 in S202 will be described with reference to the flowchart in FIG. 2B.

In S221, the system control unit 50 initially determines whether the ND button 37 related to the operation control of the ND unit 13 is pressed. If the system control unit 50 determines that the ND button 37 is pressed (YES in S221), the processing proceeds to S222. On the other hand, if the system control unit 50 determines that the ND button 37 is not pressed (NO in S221), the processing proceeds to S223.

In S222, the system control unit 50 performs processing based on the pressing of the ND button 37. Specifically, the system control unit 50 reads an ND control target value from the memory 20, updates the ND control target value based on pressing information about the ND button 37, and writes the updated target value into the memory 20. In the present exemplary embodiment, the ND button 37 may be a single button, a plurality of buttons that can output respective different values when pressed, or a slide switch that can output a value based on a slide operation amount. The system control unit 50 reads, from the memory 20, the ND control target value corresponding to the value output from the ND button 37. The processing of S222 is an example of processing for changing the ND control target value, and the present exemplary embodiment is not limited thereto.

In S223, the system control unit 50 refers to the position of the ND filter in the ND unit 13, and writes the position to the memory 20 as an ND position variable.

In S224, the system control unit 50 reads the ND control target value and the ND position variable from the memory 20, and compares the ND control target value and the ND position variable. Specifically, the system control unit 50 determines whether the ND control target value and the value of the ND position variable are equal. If it is determined that the values are equal (YES in S224), the processing proceeds to S225. If it is determined that the values are not equal (i.e., different) (NO in S224), the processing proceeds to S226.

In S225, the system control unit 50 writes "0" (i.e., information indicating that the ND filter insertion/retraction operation is stopped) to the memory 20 as the ND operation state variable. The processing for obtaining the state of the ND unit 13 ends.

In S226, the system control unit 50 performs control to operate the ND unit 13 so that the ND control target value written in the memory 20 and the value of the ND position variable become equal.

In S227, the system control unit 50 writes "1" (i.e., information indicating that the ND filter insertion/retraction operation is in process) to the memory 20 as the ND operation state variable, and ends the processing for obtaining the state of the ND unit 13.

As described above, in S204 or S205, the metadata is stored regardless of whether the ND unit 13 is in operation or stopped. However, the system control unit 50 may be configured to store only the tuning when the ND unit 13 starts operation and the timing when the ND unit 13 ends operation. Specifically, time codes about the two points, i.e., the timing when the ND unit 13 starts operation and the timing when the ND unit 13 ends operation, are written to the memory 20. A time code refers to a numerical value representing the time elapsed in the imaging state in terms of hours, minutes, seconds, and frames with the start point of imaging as 0. This can reduce the number of times of writing to the memory 20 by the system control unit 50 for reduced processing.

As described above, according to the first exemplary embodiment, the system control unit 50 can determine whether the ND unit 13 is in operation after the start of imaging, and store a flag based on the determination result in synchronization with the timing of the video data. According to the present exemplary embodiment, whether an ND filter is used and where the period in which the ND filter is applied falls in the video file can be presented to the user in an easily understandable manner, for example, when the user checks the captured video image. In other words, according to the present exemplary embodiment, the metadata recorded in association with the video data can be utilized to facilitate a search for a point in the video image where the ND filter insertion/retraction operation is in process, whereby the load of the editing operation on the user can be reduced.

In the present exemplary embodiment, the presence or absence of the operation of the ND unit 13 and the operation period can be detected by using the stored metadata. This enables implementation of information presentation processing for the user as described below in second and third exemplary embodiments.

In the present exemplary embodiment, the metadata about the insertion and retraction timing of an optical filter is described to be recorded in association with the video data. However, the imaging apparatus may output the information (e.g., metadata) about the insertion and retraction timing of the optical filter to an external apparatus in association with the video data. In such a case, the metadata is output to the external apparatus such as a display and a personal computer via the external I/F 33, and recorded on the external apparatus.

Next, a camera 100 according to a second exemplary embodiment will be described. The camera 100 according to the second exemplary embodiment has a similar configuration to that of FIG. 1. An illustration and description thereof will be omitted.

The camera 100 according to the present exemplary embodiment automatically deletes frames in which metadata indicating that the ND filter insertion/retraction operation is in process is written from video data that is recorded in the memory 20 between imaging start processing and imaging end processing. The camera 100 then stores the video data before and after the deleted frames into a single video file.

Figure 3:
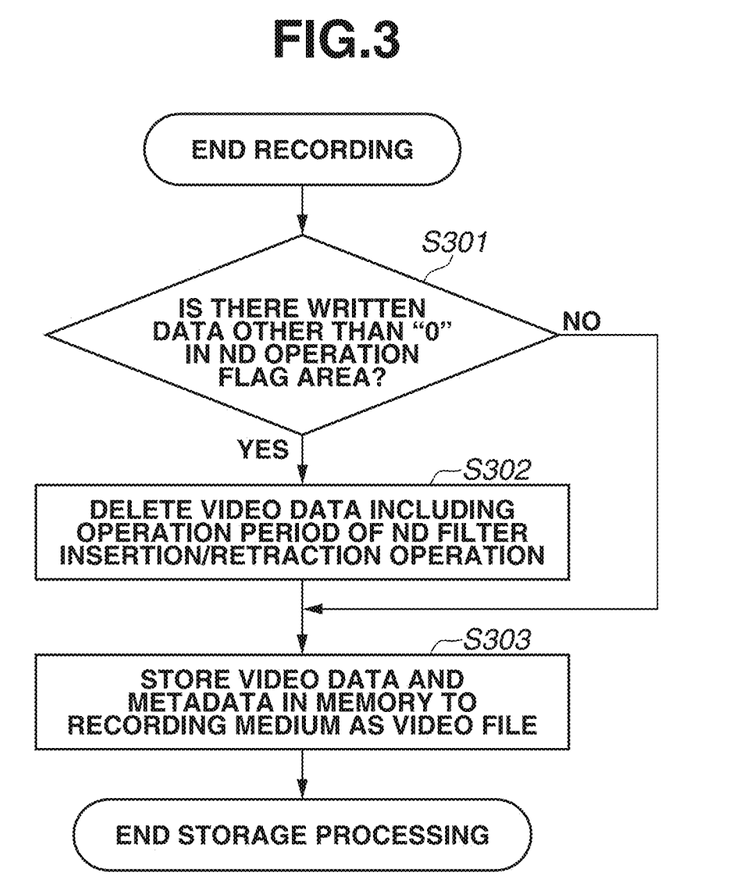
FIG. 3 is a flowchart illustrating processing for storing a video file.

FIG. 3 is a flowchart illustrating video data storage processing according to the second exemplary embodiment.

The processing illustrated in the flowchart illustrated in FIG. 3 includes a series of processes when the system control unit 50 in the imaging state receives a signal from the trigger button 22 and performs imaging end processing. Such processing is implemented by loading a program recorded in the non-volatile memory 28 into the system memory 29 and executing the program by the system control unit 50.

In S301, the system control unit 50 initially refers to the metadata stored in the memory 20, and determines whether there is written data other than "0". "0" indicates that the ND filter insertion/retraction operation is stopped in the ND operation flag area. If the system control unit 50 determines that there is written data other than "0" in the ND operation flag area (YES in S301), the processing proceeds to S302. On the other hand, if the system control unit 50 determines that there is no such written data (NO in S301), the processing proceeds to S303.

In S302, the system control unit 50 reads the data written in the ND operation flag area from the memory 20, and performs editing to delete video data including the operation period in which the ND unit 13 is making the ND filter insertion/retraction operation.

In S303, the system control unit 50 writes the video data and the metadata in the memory 20 to the recording medium 32 via the recording medium I/F 31 as a video file. If, for example, deletion is performed in the editing of S302, the video data and the metadata after the deletion are written as a video file.

As described above, according to the second exemplary embodiment, the system control unit 50 performs editing control to automatically delete the unstable portion of the video image during the ND filter insertion/retraction operation based on the stored metadata. Accordingly, an effect of reducing the editing load on the user can be expected.

Figure 4A:
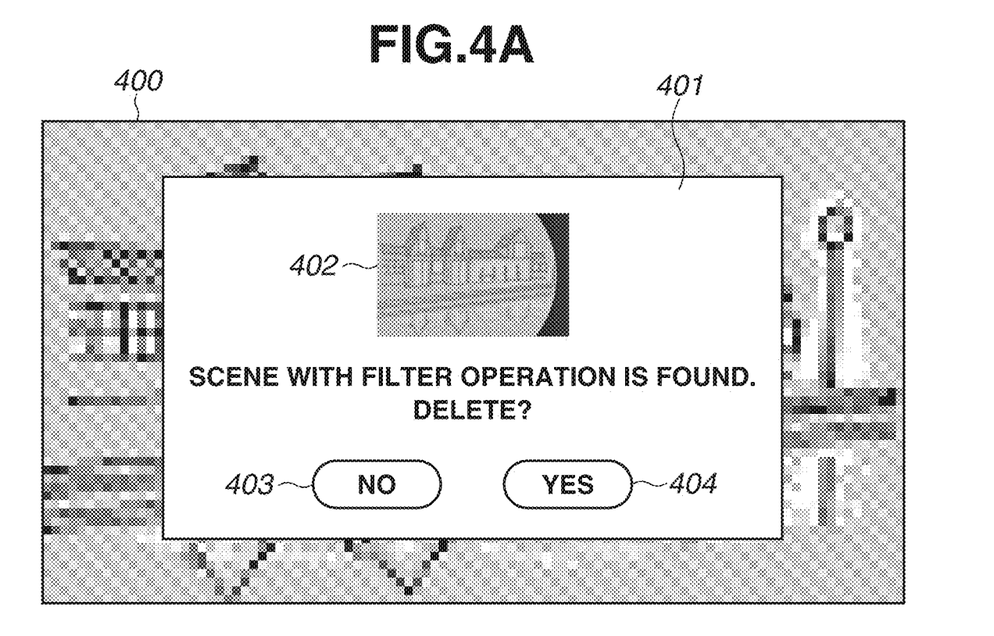
FIGS. 4A and 4B are diagrams illustrating examples of a graphical user interface (GUI) screen at a time of storing a video file.

In the processing of S302 in FIG. 3, the video image during the ND filter insertion/retraction operation is automatically deleted. However, whether to delete the video image may be selected by the user. FIG. 4A is a diagram illustrating an example of a GUI screen presented to the user when deleting video data read from the memory 20 in S302. In FIG. 4A, a camera screen 400 on the display unit 17 displays a selection screen frame 401 presented to the user when the video data is stored.

In such a case, in S302, the system control unit 50 refers to the ND operation flag area of the metadata stored in the memory 20, and clips video data on the scene including the operation period in which the ND filter insertion/retraction operation has been made. The system control unit 50 then displays a representative image 402 of the clipped video data in the selection screen frame 401. The system control unit 50 also displays a "no" button icon 403 and a "yes" button icon 404 in the selection screen frame 401. The user selects the "no" button icon 403 if the user does not consent to the deletion of the scene including the operation period in which the ND filter insertion/retraction operation is made. The user selects the "yes" button icon 404 if the user consents to the deletion. If the user gives an instruction to select the "no" button icon 403, the system control unit 50 skips the processing of S302. On the other hand, if the user gives an instruction to select the "yes" button icon 404, the system control unit 50 performs the processing of S302. The video data on the scene including the operation period in which the ND filter insertion/retraction operation is made is deleted only if the user instruction consenting to the deletion of the scene is given. Consequently, the user instruction can prevent a video image beneficial to the user from being erroneously automatically deleted if such a video image is included in the video image during the ND filter insertion/retraction operation.

Figure 4B:
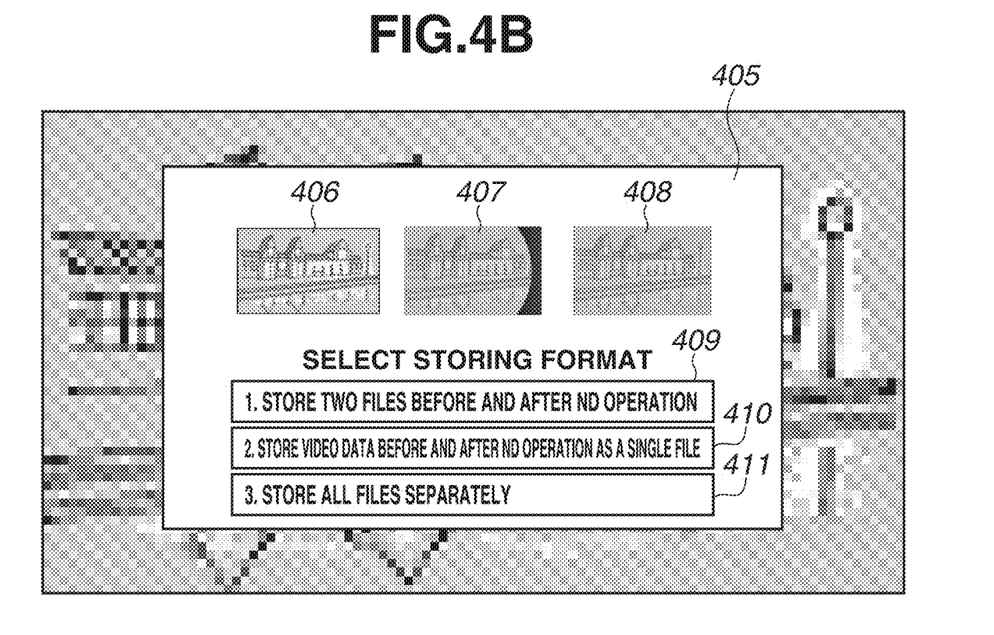

The video file to be stored may be divided and stored into three separate files which are prepared for video images before, during, and after the execution of the ND filter insertion/retraction operation. FIG. 4B is a diagram illustrating an example of a GUI screen displayed in storing the video data and metadata read from the memory 20 as a video file or files. In FIG. 4B, the system control unit 50 displays representative images 406, 407, and 408 of the video data before, during, and after the ND filter insertion/retraction operation, respectively, in a selection screen frame 405 displayed during storing. The system control unit 50 also displays three icons 409, 410, and 411 for the user to select a format to store the video data to be recorded in the selection screen frame 405. The icon 409 indicates that two video files which are prepared for video images before and after the ND filter insertion/retraction operation, are to be stored. The icon 410 indicates that the video data in the operation period of the ND filter insertion/retraction operation is deleted and video data before and after the ND filter insertion/retraction operation, is stored as a single video file. The icon 411 indicates that the video data is divided and stored into three video files which are prepared for video images before, during, and after the ND filter insertion/retraction operation. If any one of the icons 409, 410, and 411 is selected by the user, the system control unit 50 performs control to record the video data in the format corresponding to the selected icon. The storing formats are not limited to the foregoing three formats. Consequently, the user can efficiently perform editing taking into account such characteristics as the tones of the video data before and after the ND filter insertion/retraction operation, whereby the load of the editing operation is reduced.

Next, a camera 100 according to a third exemplary embodiment will be described. The camera 100 according to the third exemplary embodiment has a similar configuration to that of FIG. 1, and thus an illustration and description thereof will be omitted.

The camera 100 according to the present exemplary embodiment presents, to the user, the presence or absence of an application of an ND filter and the period of the application in an easily understandable manner.

Figure 5:
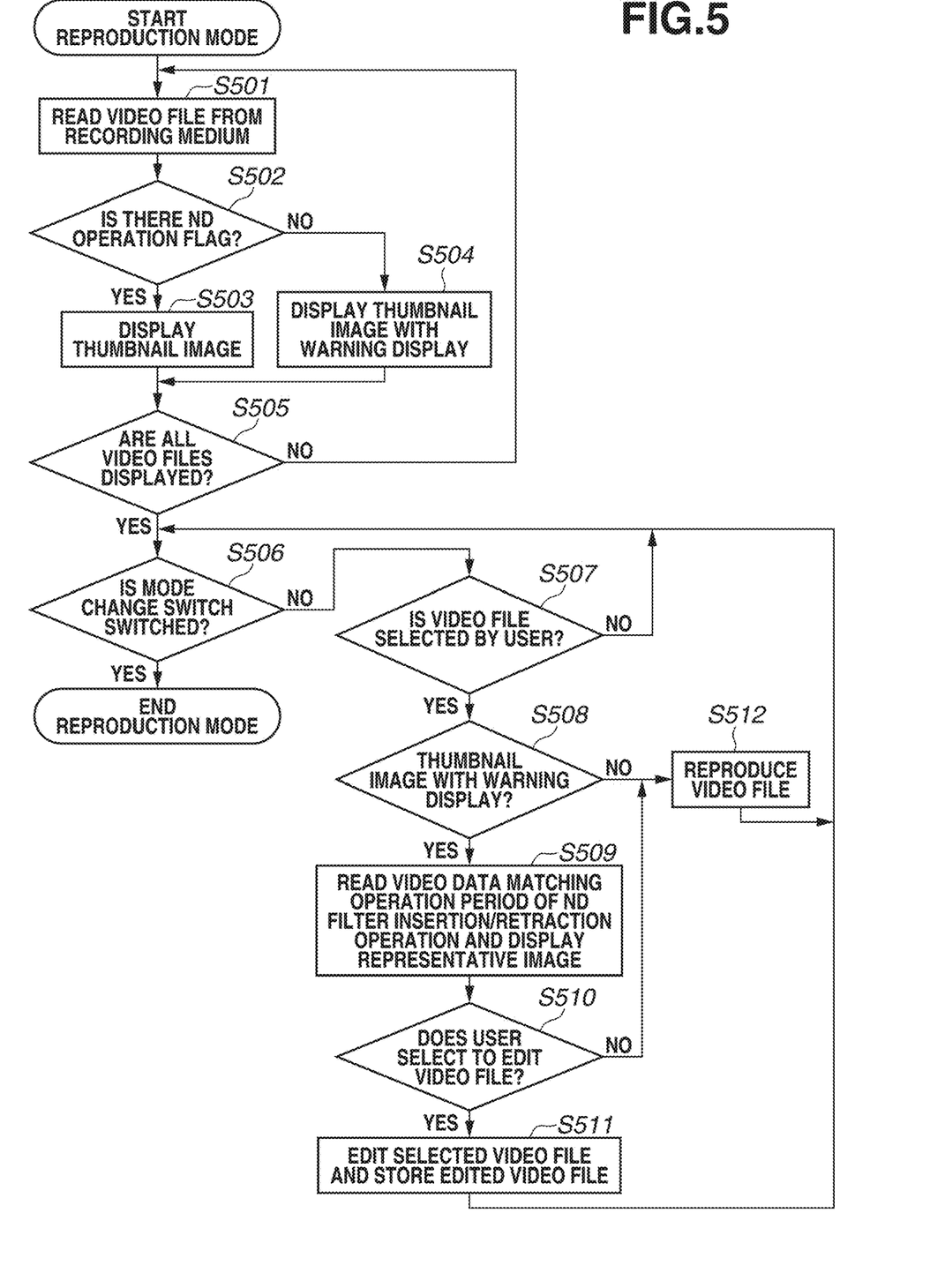
FIG. 5 is a flowchart illustrating processing for reproducing a video file.

FIG. 5 is a flowchart performed during reproduction of video data according to the third exemplary embodiment. This processing is implemented by loading a program stored in the non-volatile memory 28 into the system memory 29 and executing the program by the system control unit 50.

In S501 the system control unit 50 initially reads one video file stored in the recording medium 32 via the recording medium I/F 31, and writes the video file to the memory 20. Here, the system control unit 50 also reads the metadata stored in an accompanying manner in association with the video data. The video file to be read may include minimum information needed to display a thumbnail image. Specifically, the minimum needed information refers to one frame of video data clipped as a representative image of each video file. If information other than that indicating that the ND filter insertion/retraction operation is stopped is written in the ND operation flag area of the metadata, the system control unit 50 may clip and read one frame of video data from each period before, during, and after the ND filter insertion/retraction operations.

In S502, the system control unit 50 refers to the metadata accompanying the read video data, and determines whether there is an ND operation flag. If the system control unit 50 determines that there is the ND operation flag (YES in S502), the processing proceeds to S503. If the system control unit 50 determines that there is no ND operation flag (NO in S502), the processing proceeds to S504. At this time, the metadata to be referred is not limited to the ND operation flag, and flags indicating an application of various filters such as an infrared (IR) filter may be referred to.

In S503, the system control unit 50 transmits the read video file to the display unit 17 via the image processing unit 19, the memory control unit 18, and the D/A converter 16, so that the representative image of the video file is displayed in a thumbnail format. After S503, the processing proceeds to S505.

In S504, the system control unit 50 provides a warning display for notifying the user that the video file includes the operation period in which the ND filter insertion/retraction operation is made based on the information about the metadata stored to accompany the video data, in addition to processing similar to that of S503. The display contents here may be ones for issuing a warning that the video file includes the operation period in which the ND filter insertion/retraction operation is made, and the video file is not edited. Further, the display contents may also be ones for issuing a notification that the video file includes the operation period in which the ND filter insertion/retraction operation is made, and the operation period has been edited. After S504, the processing proceeds to S505.

Figure 6A:
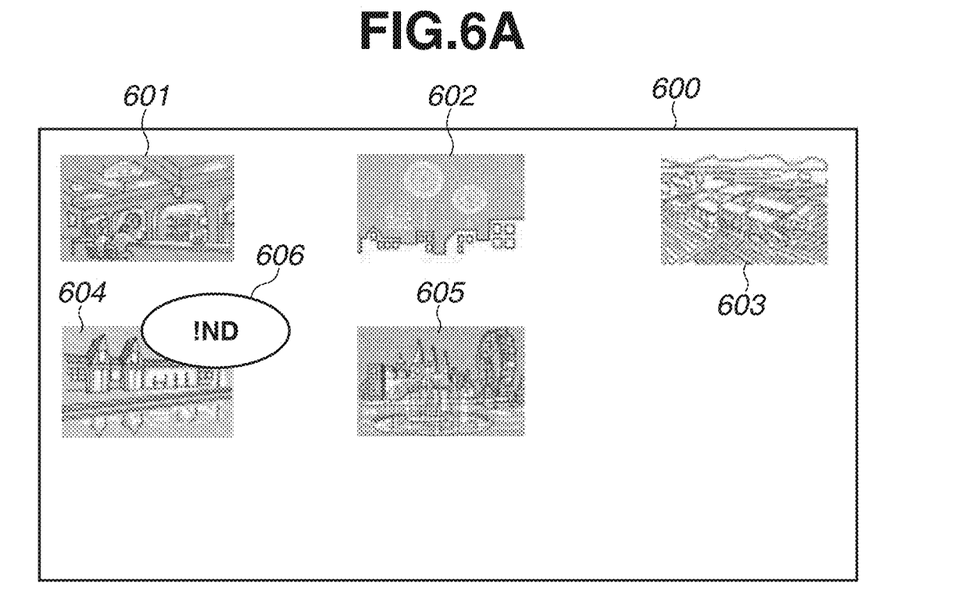
FIGS. 6A and 6B are diagrams illustrating examples of a GUI screen at a time of reproducing a video file.

FIG. 6A is a diagram illustrating an example of a GUI screen frame 600 on a reproduction screen displayed on the display unit 17 if there is a video file to which an ND filter is applied. Thumbnail images 601 to 605 of representative images of respective video files are displayed in the GUI screen frame 600. If any of the video files includes metadata indicating the application of an ND filter (i.e., the video file corresponding to the thumbnail image 604 illustrated in FIG. 6A), an icon 606 indicating the applied filter is displayed. In other words, the icon 606 indicates the application of the ND filter, whereby the user can recognize that the ND filter is applied to the video file corresponding to the thumbnail image 604.

Return to the description of the flowchart of FIG. 5.

In S505, the system control unit 50 determines whether all video files to be displayed which are stored in the recording medium 32 are displayed. If the system control unit 50 determines that all the video files are displayed (YES in S505), the processing proceeds to S506. If the system control unit 50 determines that not all the video files are displayed (NO in S505), the processing returns to S501.

In S506, the system control unit 50 refers to the state of the mode change switch 23, and determines whether the mode change switch 23 is switched from the reproduction mode to another mode. If the system control unit 50 determines that the mode change switch 23 is switched from the reproduction mode to another mode (YES in S506), the system control unit 50 ends the reproduction mode, and the processing ends. If the system control unit 50 determines that the mode change switch 23 is not switched (NO in S506), the processing proceeds to S507.

In S507, the system control unit 50 determines whether a video file is selected by the user selecting a thumbnail image via the operation unit 27. If the system control unit 50 determines that any one of the video files is selected (YES in S507), the processing proceeds to S508. If the system control unit 50 determines that none of the video files is selected (NO in S507), the processing returns to S506.

In S508, the system control unit 50 determines whether the thumbnail image selected by the user is the one accompanied by a warning display described above. If the system control unit 50 determines that the thumbnail image with the warning display is selected by the user (YES in S508), the processing proceeds to S509. If the system control unit 50 determines that the thumbnail image without the warning display is selected (NO in S508), the processing proceeds to S512.

In S512, the system control unit 50 reproduces the video file corresponding to the selected thumbnail image and displays the reproduced video image on the display unit 17. After S512, the processing returns to S506.

In S509, the system control unit 50 refers to the metadata accompanying the selected video file, and reads the video data matching the operation period of the ND filter insertion/retraction operation in the metadata from the recording medium 32 via the recording medium I/F 31. The system control unit 50 here displays a representative image of the read video data on the display unit 17, and displays a selection screen to determine whether to perform editing to the user.

Figure 6B:
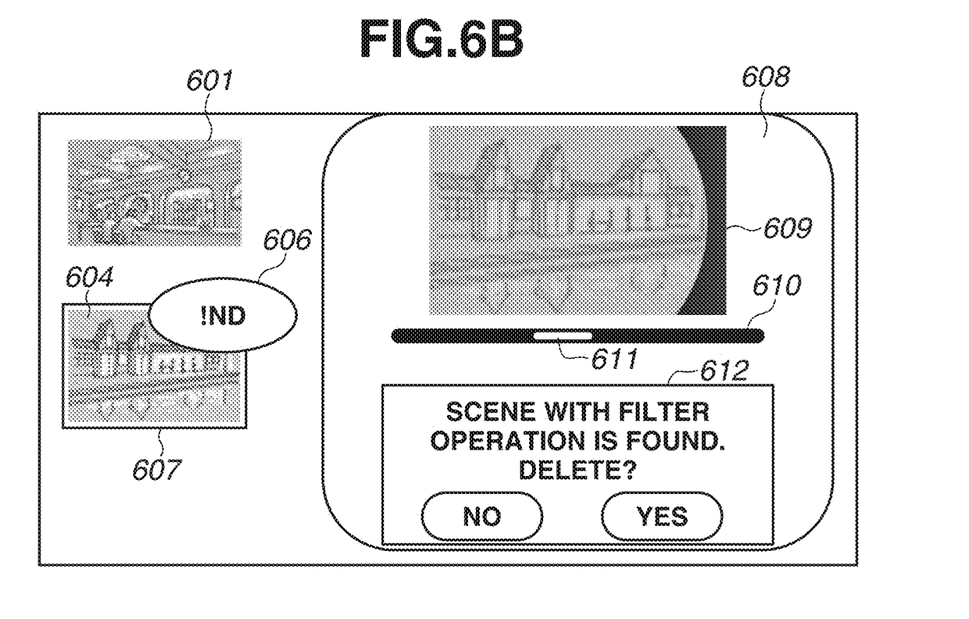

FIG. 6B is a diagram illustrating an example of the GUI screen when a video file to which the ND filter is applied is selected. The GUI screen displays thumbnail images 601 and 604 similar to those illustrated in FIG. 6A. If a selection cursor 607 is moved by using the touch panel 21 or a directional pad of the operation unit 27 illustrated in FIG. 1 and the thumbnail image 604 corresponding to the video file to which the ND filter is applied is selected, the system control unit 50 displays a window 608. The system control unit 50 displays, in the window 608, a representative image 609 of the video data in the period of the ND filter insertion/retraction operation, a sequence bar 610 indicating a degree of progress in the entire period of the video file, and a bar 611 representing the period of the ND filter insertion/retraction operation. The system control unit 50 also displays a selection screen frame 612 for making the user select whether to perform editing to delete the scene to which the ND filter is applied.

In S510, the system control unit 50 determines whether the user selects edition of the video file via the operation unit 27 or the touch panel 21. If the system control unit 50 determines that the user selects the edition of the video file (YES in S510), the processing proceeds to S511. On the other hand, if the system control unit 50 determines that the user does not select the edition of the video file (NO in S510), the processing proceeds to S512.

In S511, the system control unit 50 reads the selected video file from the recording medium 32 into the memory 20 via the recording medium I/F 31, performs editing processing on the video file, and then stores the edited video file in the recording medium 32 via the recording medium I/F 31. The edited video file which is to be stored may take the form of a single video file including the video data and the metadata, two video files before and after the ND filter insertion/retraction operation, or three video files before, during, and after the ND filter insertion/retraction operation.

As described above, according to the third exemplary embodiment, whether each video file includes a period of the ND filter insertion/retraction operation can be detected on the reproduction screen based on the stored metadata.

In S502, whether to display the thumbnail image of the video file with or without the warning display is determined based on the ND operation flag. However, other flags stored in the metadata may be used. For example, a warning flag "1" can be written into video files to which the ND filter is applied and that are not edited. The warning flag then can be reset to "0" based on a warning flag cancel command from the user or by an editing operation. In this manner, ND filter-applied video files that are unedited and edited can be distinguished.

In the foregoing exemplary embodiments, the ND unit 13 is described to include one or a plurality of ND filters having respective different light attenuation amounts. However, an optical filter unit including a plurality of optical filters having respective different characteristics, such as an ND filter and an IR filter, may be used. In such a case, the optical filter unit includes insertion/retraction mechanisms that can each take both a state where any one of the plurality of optical filters is inserted into or retracted from the optical path in a switched manner and a state where none of the optical filters is located in the optical path. The system control unit 50 then performs control to operate the insertion/retraction mechanisms of the optical filter unit based on the user's instructions given via, for example, an optical filter selection button provided on the operation unit 27.

In the foregoing exemplary embodiments, a video camera has been described as an example. However, exemplary embodiments can also be applied to, for example, a digital single-lens reflex camera, a mirrorless single-lens camera, and a compact digital camera having a moving image capturing function and an optical filter switching function. In addition, exemplary embodiments can be applied to, for example, a vehicle-mounted camera, a surveillance camera, a medical camera, an industrial camera, a personal computer, a tablet terminal, a smartphone, and a portable game machine having a moving image capturing function and an optical filter switching function.

According to the foregoing exemplary embodiments, the presence or absence of application of an optical filter and the period of application can be presented to the user in an easily understandable manner when the user checks captured video images.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2018-213518, which was filed on Nov. 14, 2018 and which is hereby incorporated by reference herein in its entirety.

What is claimed is:

1. An imaging apparatus comprising:
   an image sensor that captures an image; and
   control circuitry that controls an inserting/removing operation for inserting or removing an optical filter into or from an optical path between a lens and the image sensor, and outputs video data including the captured image with information indicating a period between a start of the inserting/removing operation and an end of the inserting/removing operation to a recording medium or an external apparatus.

2. The imaging apparatus according to claim 1, wherein the information indicating the period between the start of the inserting/removing operation and the end of the inserting/removing operation includes time codes indicating timing of the start of the inserting/removing operation and timing of the end of the inserting/removing operation.

3. The imaging apparatus according to claim 1, wherein the control circuitry also outputs information indicating a period in which the inserting/removing operation is stopped.

4. The imaging apparatus according to claim 1, further comprising a display device that displays information indicating that the video data includes video data corresponding to the period between the start of the inserting/removing operation and the end of the inserting/removing operation.

5. The imaging apparatus according to claim 1, further comprising a display device that displays information indicating an entire period of the video data, and information indicating the period between the start of the inserting/removing operation and the end of the inserting/removing operation.

6. The imaging apparatus according to claim 1, wherein the control circuitry divides the video data into video data corresponding to a period before the inserting/removing operation starts, video data corresponding to the period between the start of the inserting/removing operation and the end of the inserting/removing operation, and video data corresponding to a period after the inserting/removing operation ends.

7. The imaging apparatus according to claim 1, wherein the control circuitry deletes the period between the start of the inserting/removing operation and the end of the inserting/removing operation from an entire period of the video data.

8. The imaging apparatus according to claim 1, further comprising a display device that displays a representative image of video data corresponding to the period between the start of the inserting/removing operation and the end of the inserting/removing operation, before the period between the start of the inserting/removing operation and the end of the inserting/removing operation is deleted from an entire period of the video data.

9. The imaging apparatus according to claim 1, further comprising a display device that displays information for notifying a user that the period between the start of the inserting/removing operation and the end of the inserting/removing operation is deleted from an entire period of the video data, before the period between the start of the inserting/removing operation and the end of the inserting/removing operation is deleted from the entire period of the video data.

10. The imaging apparatus according to claim 1, further comprising a display device that displays a representative image of video data corresponding to a period before the retraction inserting/removing operation starts, a representative image of video data corresponding to the period between the start of the inserting/removing operation and the end of the inserting/removing operation, and a representative image of video data corresponding to a period after the inserting/removing operation ends.

11. The imaging apparatus according to claim 1, wherein the optical filter is an optical filter configured to attenuate an amount of light, an optical filter configured to pass an infrared ray, or a polarizing filter.

12. The imaging apparatus according to claim 1, wherein the control circuitry generates a first file including video data corresponding to a period before the inserting/removing operation starts, and generates a second file including video data corresponding to a period after the inserting/removing operation ends.

13. The imaging apparatus according to claim 1, wherein the control circuitry generates one file including video data corresponding to a period before the inserting/removing operation starts and video data corresponding to a period after the inserting/removing operation ends.

14. The imaging apparatus according to claim 1, wherein the control circuitry generates a first file including video data corresponding to a period before the inserting/removing operation starts, generates a second file including video data corresponding to the period between the start of the inserting/removing operation and the end of the inserting/removing operation, and generates a third file including video data corresponding to a period after the inserting/removing operation ends.

15. A method comprising:
    causing an image sensor to capture an image;
    controlling an inserting/removing operation for inserting or removing an optical filter into or from an optical path between a lens and the image sensor; and
    outputting video data including the captured image with information indicating a period between a start of the inserting/removing operation and an end of the inserting/removing operation to a recording medium or an external apparatus.

16. A non-transitory storage medium that stores a program causing a computer to execute a method, the method comprising:
    causing an image sensor to capture an image;
    controlling an inserting/removing operation for inserting or removing an optical filter into or from an optical path between a lens and the image sensor; and
    outputting video data including the captured image with information indicating a period between a start of the inserting/removing operation and an end of the inserting/removing operation to a recording medium or an external apparatus.

* * * * *